United States Patent [19] [11] Patent Number: 4,878,117
Ikehira et al. [45] Date of Patent: Oct. 31, 1989

[54] VIDEO SIGNAL MIXING UNIT FOR SIMULTANEOUSLY DISPLAYING VIDEO SIGNALS HAVING DIFFERENT PICTURE ASPECT RATIOS AND RESOLUTIONS

[75] Inventors: Kimimasa Ikehira, Hadano, Japan; Ming-Chi Wu, Taipei; Chih-Yuan Liu, Chu-Pei Hsinchu, both of Taiwan

[73] Assignees: Ricoh Company, Ltd., Tokyo, Japan; Industrial Technology Research Institute, Taiwan, Taiwan

[21] Appl. No.: 155,511

[22] Filed: Feb. 12, 1988

[30] Foreign Application Priority Data

Feb. 14, 1987 [JP] Japan .................................. 62-32226

[51] Int. Cl.4 ............................................ H04N 5/275
[52] U.S. Cl. .................................................... 358/183
[58] Field of Search .......................... 358/22, 183, 147

[56] References Cited

U.S. PATENT DOCUMENTS 4,266,242 5/1981 McCoy ................................. 358/22
4,599,611 7/1986 Bowker ............................... 358/183
4,622,545 11/1986 Atkinson ............................. 358/183

FOREIGN PATENT DOCUMENTS 3702220 8/1988 Fed. Rep. of Germany .
58-101341 6/1983 Japan .
59-214085 12/1984 Japan .
61-25186 2/1986 Japan .

Primary Examiner—Tommy P. Chin
Attorney, Agent, or Firm—Oblon, Spivak, McClelland, Maier & Neustadt

[57] ABSTRACT

A display control unit for combining first video signal transmitted from a first video information source which is controlled by a first pixel clock and a first synchronizing signal with second video signal transmitted from a second video information source which is controlled by a second pixel clock and a second synchronizing signal so that the first and the second video signals can be displayed on a CRT display device which is controlled by the first pixel clock and the first synchronizing signal.

8 Claims, 17 Drawing Sheets

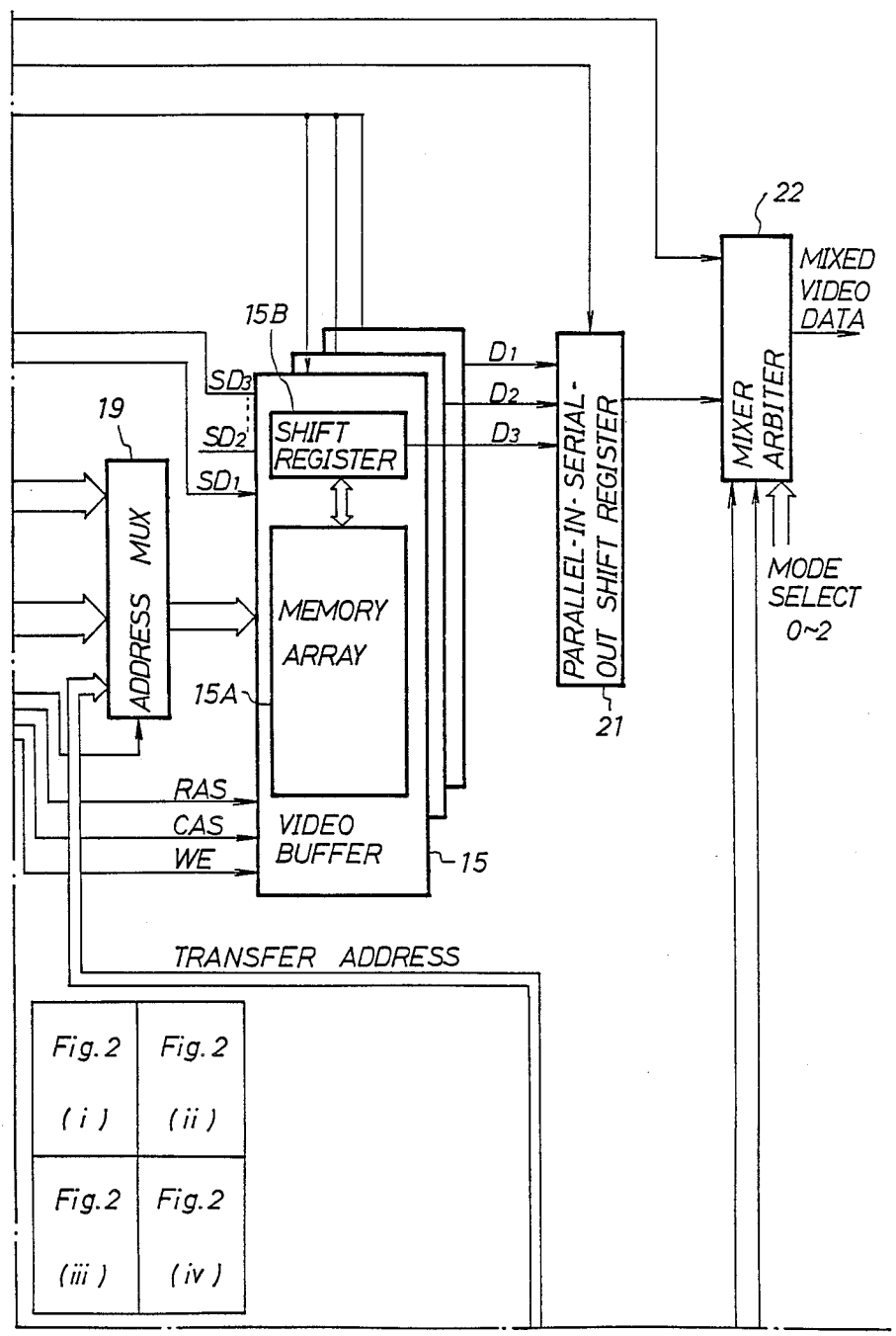
Fig.2 (ii)

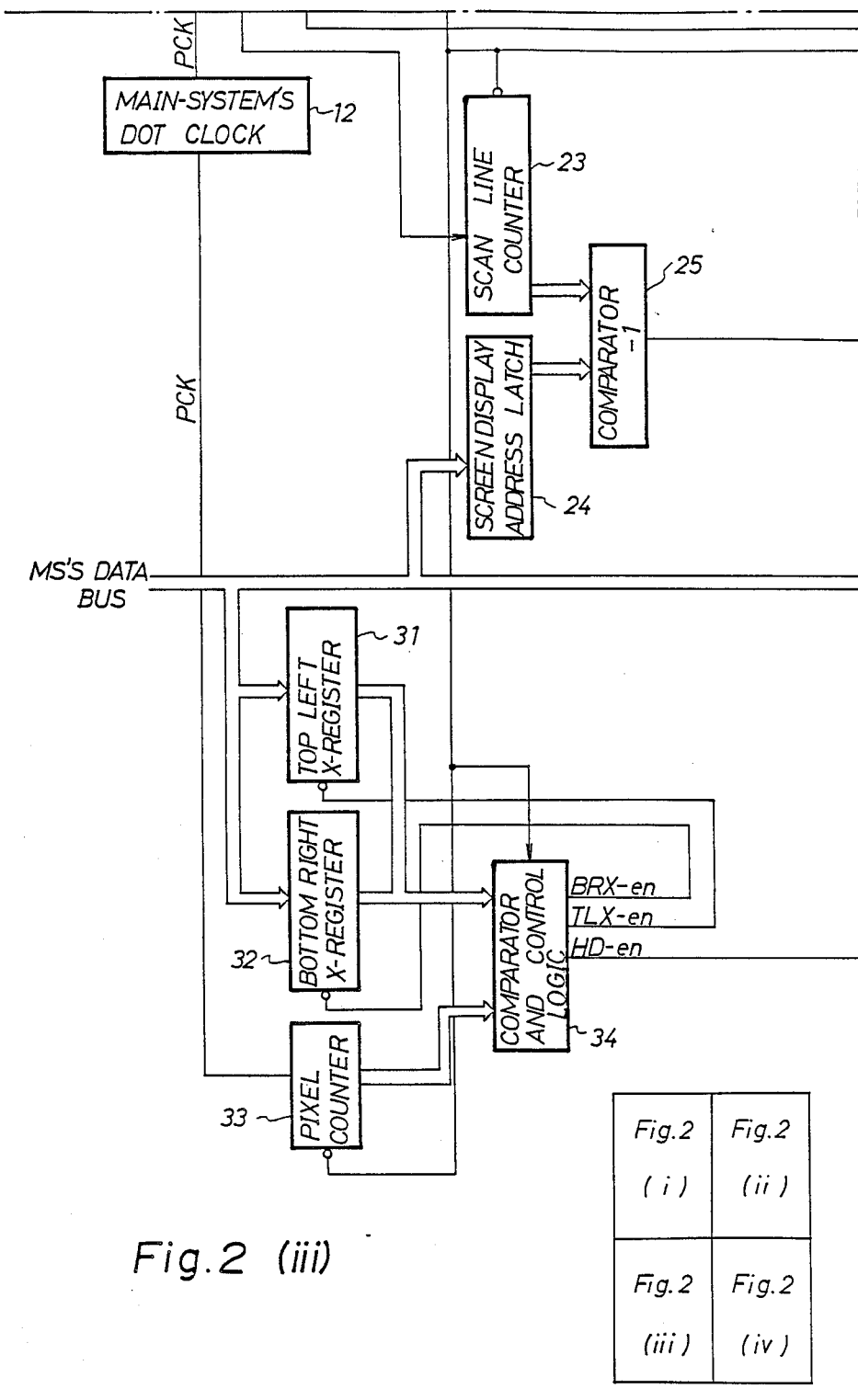
Fig.2 (iii)

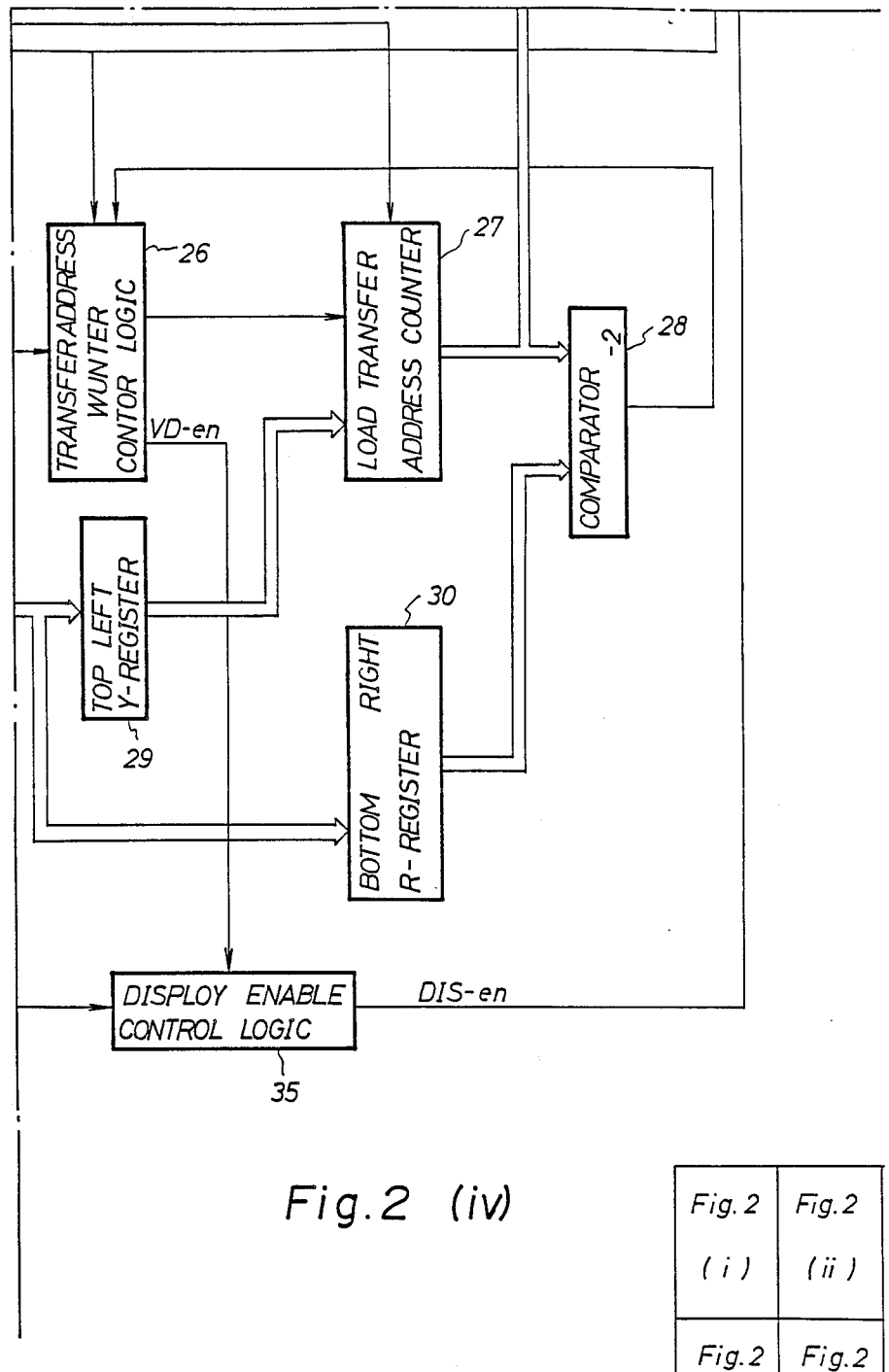
Fig. 2 (iv)

| MODE SELECT 2 | MODE SELECT 1 | MODE SELECT 0 | VISIBLE ON THE CRT SCREEN |
|---|---|---|---|
| 0 | 0 | 0 | MAIN-SYSTEM COMBINED WITH SUBSYSTEM |
| 0 | 0 | 1 | SUBSYSTEM ONLY |
| 0 | 1 | 0 | MAIN-SYSTEM ONLY |
| 0 | 1 | 1 | SUBSYSTEM OVERRIDING MAIN-SYSTEM |
| 1 | 1 or 0 | 1 or 0 | MAIN-SYSTEM OVERRIDING SUBSYSTEM |

VIDEO SIGNAL MIXING UNIT FOR SIMULTANEOUSLY DISPLAYING VIDEO SIGNALS HAVING DIFFERENT PICTURE ASPECT RATIOS AND RESOLUTIONS

BACKGROUND OF THE INVENTION

1. Field of the invention

The present invention concerns a display control unit for a CRT display device of office computers, personal computers, word processors, DPS (data processing systems) or like other various data processing devices having display terminals.

More specifically, it relates to a display control unit for displaying video data sent from at least two independent video information sources on a screen of a single CRT display device, and particularly, it relates to a display control unit for combining video data transmitted from a plurality of subsystems each controlled by its inherent pixel clocks, synchronizing signals, etc. with that of a main system so that they can be seen simultaneously on one identical screen, thereby effectively utilizing video information sources, as well as improving operability.

2. Description of the prior art

There has been known an image display system in which video information sources controlled by their respective pixel clocks, sync signals, etc. frequencies of which differ with respect to each other, are connected together, and their video data are displayed on a single CRT display device.

In the following description, an image display system having one CRT display device controlled by a sync signal having an inherent frequency is referred to as a main system, while image display systems other than the above-mentioned main system are referred to as subsystems.

The main system has a function of preparing its own video data and mixing the same with video data transmitted from subsystems so that a user can display them on one identical screen.

For displaying video data of main system and those of at least two subsystems on one identical CRT display screen, two methods have been known so far in the computer field.

In the first method, each of the main system and subsystems comprises a CPU, a video buffer memory for storing the video data outputted from the CPU, a CRT controller for reading out the video data from the video buffer memory and converting the data into serial signals and a CRT display device for receiving the serial signals from the CRT controller and displaying the signals.

For transferring the video data of the subsystems to the main system, CPUs of the main system and the subsystems are connected by way of an interface. Since the video data of the subsystem stored in the video buffer memory of the subsystem is transferred by way of the CPUs of the subsystem and the main system to the buffer memory of the main system in the first method, it has a disadvantage that it takes much time to transfer the video data.

In the second method, the CRT controller of the main system and the buffer memory of the subsystem are connected so that the CRT controller of the main system can directly read out the video data from the buffer memory of the subsystem.

However, respective subsystems are generally manufactured by different manufacturers.

In view of the above, since sync signal, etc. are different, it is difficult in many cases for the CRT controller of the main system to directly access the video buffer memories of the subsystems.

Accordingly, an interface similar to that of the first method is required in most cases so that no remarkable effect can be expected.

In this way, the prior methods described above involve drawbacks that they require a complicated interface or require much processing time for displaying the video data of the subsystems at the CRT display device of the main system, etc.

The present invention has been made in view of the foregoings and the object thereof is to provide a display control unit for mixing the video data of subsystems having different sync signals and pixel clocks with the video data of the main system and displaying the mixed data on a screen of a CRT display device of the main system, which does not require to modify the hard wares of the subsystems or to move the video data in the video buffer memory of the subsystem to the video buffer memory of the main system, to shorten transferring time of the video data of the subsystems.

The foregoing object of the present invention can be attained by a display control unit for combining first video signal transmitted from a first video information source which is controlled by a first pixel clock and a first synchronizing signal with second video signal transmitted from a second video information source which is controlled by a second pixel clock and a second synchronizing signal so that the first and the second video signals can be displayed on a CRT display device which is controlled by the first pixel clock and the first synchronizing signal, said unit comprising;
- a video buffer means to be connected to said second video information source for storing said second video signal,
- third pixel clock generating means to be connected to said first information source for generating a third pixel clock in accordance with said first synchronizing signal and said second pixel clock, and
- video signal selecting means to be connected to said first video information source, and connected to said buffer means and said third pixel clock generating means for selectively outputting said first video signal sent from said first video information source and said second video signal transferred from said video buffer means at a rate of said third pixel clock.

In a case where two video information sources are independent with each other, there often occurs such a case that at the moment when the main system displays a certain pixel on a certain scanning line, a subsystem displays a different pixel on a different scanning line.

In the present invention, video information sources independent with each other and also different with respect to their sync signals, etc. can be combined and displayed on one identical screen by the following idea.

In the device according to the present invention, memories called video buffer are used for storing the video data of each frame of the subsystem. While the video data of a certain frame is being stored, the video data of another frame stored in the video buffer is taken out and displayed on the screen.

In other words, the video buffer has a dual port structure in which any video data sent out from the subsystem is once stored in the video buffer, and simultaneously, other video data is read out from the video buffer at proper timings to be displayed on the CRT screen of the main system.

In the display control unit according to the present invention, the videobbuffer having such a dual port structure is used.

BRIEF DESCRIPTION OF THE ACCOMPANYING DRAWINGS

Description will be made specifically by way of preferred embodiments of the invention while referring to the accompanying drawings.

The present invention can be modified and changed variously, with no particular restrictions to the following embodiments.

Figure 1:
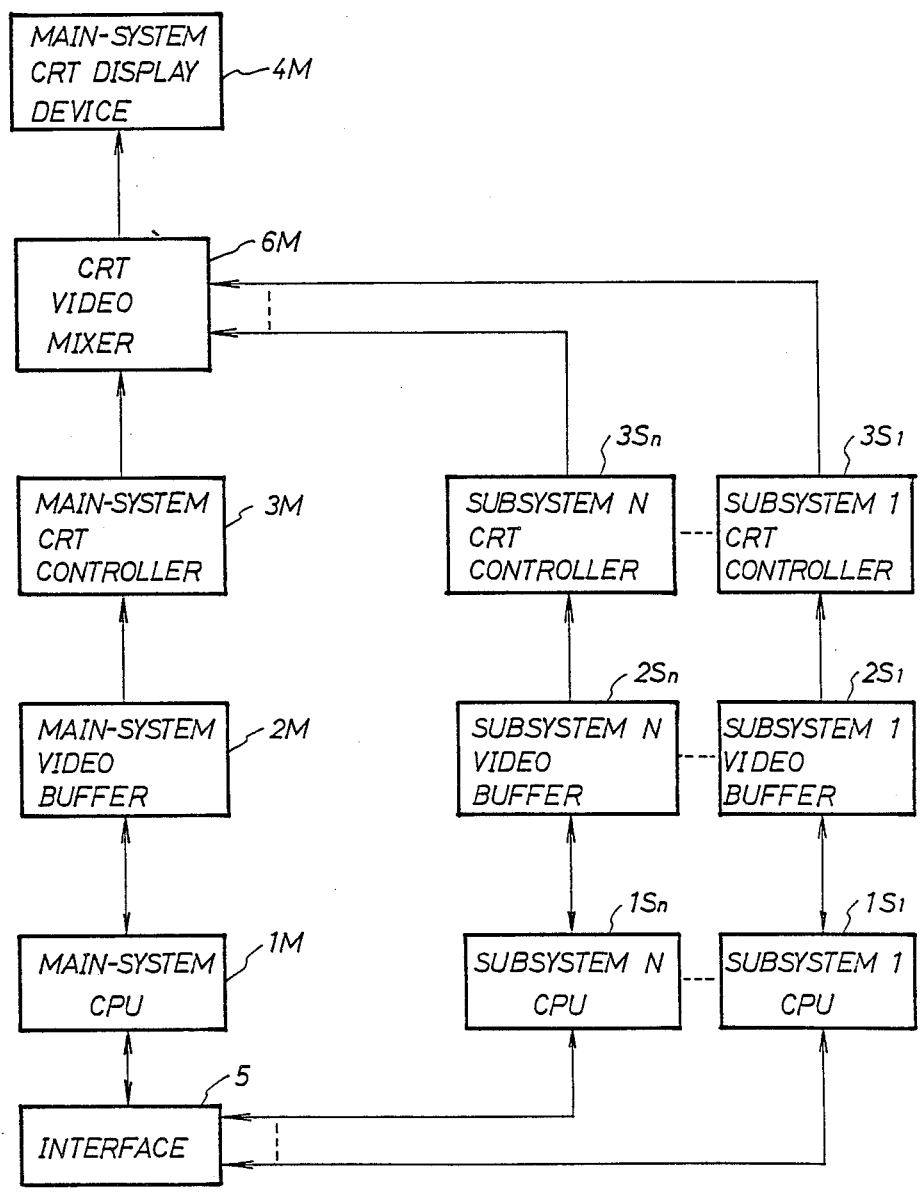
FIG. 1 is a block diagram of one embodiment of a display system having the display control unit according to the present invention.

FIG. 1 is a block diagram of one embodiment of the display system according to the present invention.

As can been seen from FIG. 1, a CRT video mixer 6M is added to the main system.

To the CRT video mixer 6M, are inputted video signals transmitted from a main system's CRT controller 3M and a first subsystem's CRT controller 3S1 to an nth subsystem's CRT controller $3S_n$ respectively.

Accordingly, in the image display system having the control unit of the present invention, the video data of the subsystems are converted into video signals in their respective systems and then supplied to the main system.

Explanation will be made of a simplest case, in which video signals are sent from a video information source of one subsystem.

The display control unit of the present invention comprises the following blocks.

Figure 2:
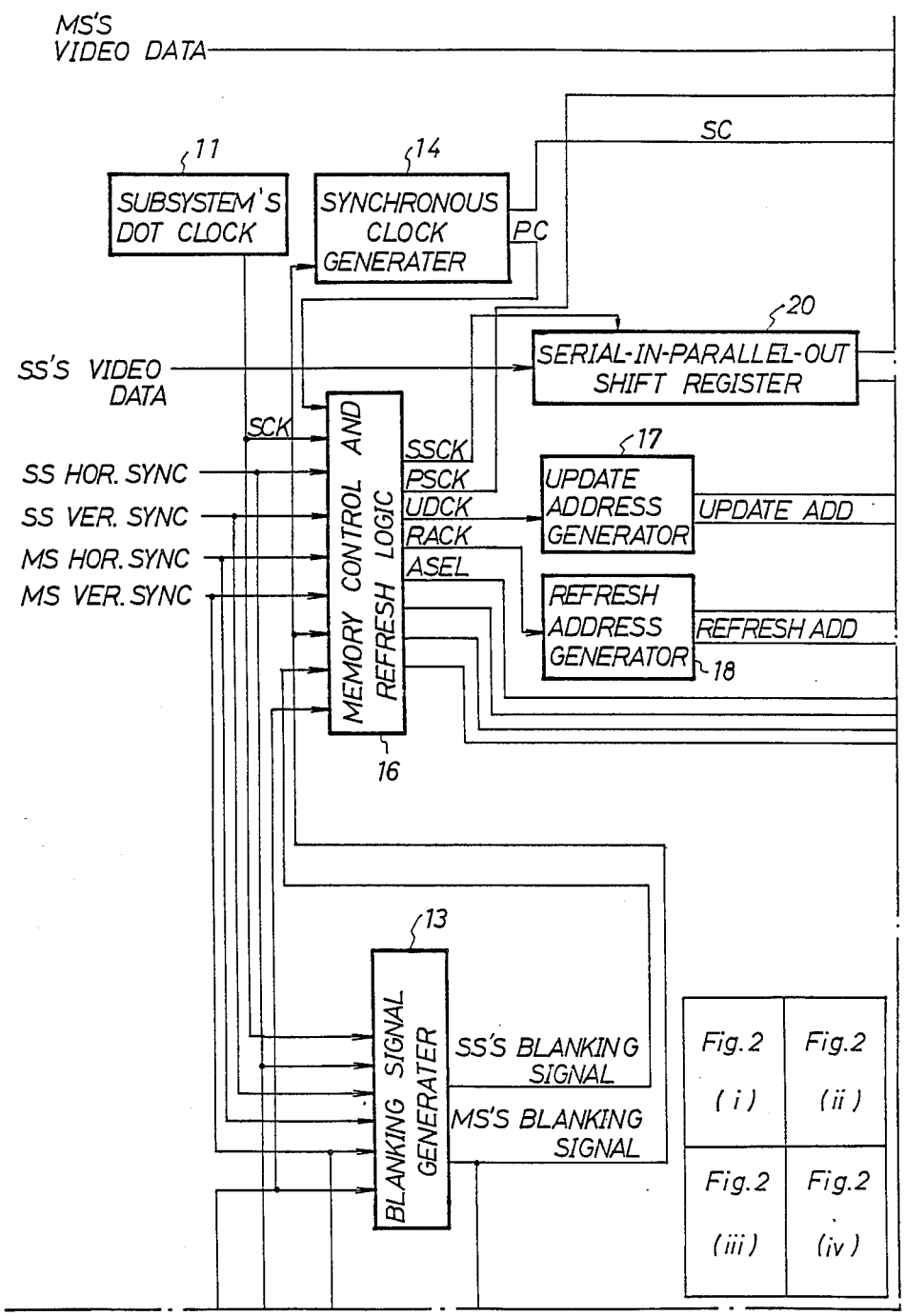
FIG. 2 is a functional block diagram of main part of the display control unit according to the present invention.

FIG. 2 is a functional block diagram of main part of the display control unit according to the present invention shown in FIG. 1.

In the figure, there are shown a subsystem dot (pixel) clock generator 11, a main system dot (pixel) clock generator 12, a blanking signal generator 13, a sync clock generator 14, a video buffer 15, a memory array 15A, a shift register 15B, a memory control and refresh logic 16, an update address generator 17, a refresh address generator 18, an address multiplexer 19, an S-P (serial-in-parallel-out) shift register 20, a P-S (parallel-in-serial-out) shift register 21, a mixer 22, a scanning line counter 23, a screen address latch 24, first comparator 25, a transfer address counter control logic 26, a transfer address counter 27, second comparator 28, a top left Y register 29, a bottom right Y register 30, a top left X register 31, a bottom right X register 32, a pixel counter 33, a comparison and control logic 34, a display control logic 35, main system's video data MS-VD, subsystem's video signal SS-VS, subsystem's horizontal sync signal SS-Hsy, subsystem's vertical sync signal SS-Vsy, main system's horizontal sync signal MS-Hsy, main system's vertical sync signal Ms-Vsy, main system's data bus MS-DB, subsystem's pixel clock SCK, main system's pixel (dot) clock PCK, sync clock PC formed by the sync clock generator 14, update address clock UDCK, clock RACK for the refresh address generator 18, shift clock SSCK for the S-P shift register 20, shift clock PSCK for the P-S shift register 21, address select signal ASEL, subsystem's blanking signal SS-BS, main system's blanking signal MS-BS, enable signal TLx-en for controlling the top left X register 31, enable signal BRx-en for controlling the bottom light X register 32, subsystem's horizontal display enable signal HD-en, vertical display enable signal VD-en, display enable signal Dis-en for the CRT display, mode select signals ms0-ms2, and mixed video signal Mix-Vs.

Prior to explaining the operation of the display control unit shown in FIG. 2, constitutions and functions of principal blocks are explained.

Reference is made of the sync clock generator 14 at first.

Since the subsystem's video signal is mixed with the main system's video signal and displayed on the main system's CRT, it must synchronize with the main system's sync signal. The sync clock generator 14 is the circuit that can accomplish this requirement. During the horizontal sync period of the main system, there is no clock generated in this circuit. Outside the horizontal sync period this circuit starts to generate the clock that is used to shift out the subsystem's video signal stored in the shift register of the video buffer. Therefore, for each horizontal scan line, the first pixels of these two systems can be aligned.

Various kinds of circuits can be used for the sync clock generator that conducts such an operation.

Figure 3:
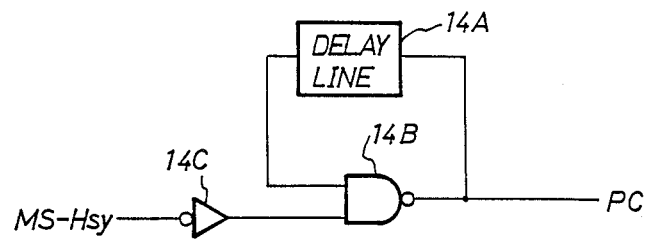
FIG. 3 is a circuit diagram of the sync clock generator 14 shown in FIG. 2.

FIG. 3 shows one example of the sync clock generator 14 shown in FIG. 2. In the drawing, are shown a delay line 14A, a NAND gate 14B and an inverter 14C.

The delay time of the delay line 14A plus the logic gate is determined by the following way.

Assume that the resolution of the main system's CRT is Mh×Mv pixels, while the resolution of the subsystem's CRT is Sh×Sv pixels.

In this case, for displaying all the video signals of the subsystem on the screen of the main system's CRT display device and maintaining the original aspect ratio of the subsystem's video signal, the following equations must be satisfied.

(a) $Pv = Rv \times (Sv/Mv) \times 100 \leq 100$ (%)

(b) $Ph = Pv \times (Sx/Sy) \times (My/Mx) \leq 100$ (%)

Where Rv is an integer which represents the vertical replication factor of the subsystem's video data. The subsystem's video data in the vertical direction will be replicated Rv times.

Pv represents a percentage of the subsystem's screen that occupies the main system's screen in the vertical direction.

Ph represents a percentage of the subsystem's screen that occupies the main system's screen in the horizontal direction.

Sx/Sy represents the ratio of the horizontal screen length versus the vertical screen length of the subsystem's CRT display device.

My/Mx represents the ratio of the vertical screen length versus the horizontal screen length of the main system's CRT display device.

Further, a horizontal replication factor Rh of the subsystem's video signal can be defined with the following equation.

$$Rh = Ph \times (Mh/Sh).$$

The subsystem's video signal in the horizontal direction is prolonged Rh times.

There are several possible values of the factor Rv which can satisfy the equations (a) and (b), but the maximum value designated as Rv (max) must be chosen so that the subsystem's video display can occupy the almost full of the main system's CRT screen.

The shift clock PSCK for the P - S shift register 21 which shifts out the serial subsystem video data VDD to the mixer 22 has the same period as the period of the sync clock PC.

Display enable time DNT of a subsystem's horizontal scanning line, and a period of the sync clock PC are determined by the following equations.

$$DNT = DT \times Ph/100$$
$$PC = DNT/Sh$$

Where DT is the display enable time in the main system's horizontal scanning line.

The total delay time T of the delay line 14A plus the logic gate is set at half of the period of the sync clock PC.

That is, the period of the sync clock PC
= 2T
= 2 (T1+T2)
where T1 is a delay time of delay line 14A, and T2 is a delay time of the logic gate.

Explanation will be made of the video buffer 15 next. The video buffer 15 has memories for storing the video signals sent out from the subsystem and the memory capacity thereof is equal to that of the video buffer of the subsystem.

Figure 4:
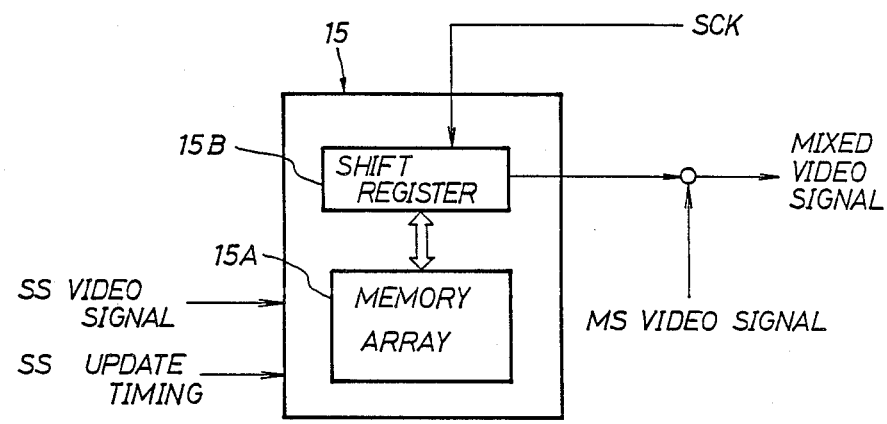
FIG. 4 is a view illustrating a constitution of the video buffer 15 used in the display control unit of the present invention.

FIG. 4 shows detailed constitution of the video buffer used in the display control unit of the present invention. In FIG. 4, a component identical with that in FIG. 2 is given the identical reference.

Since the multiport video RAMs are used for the video buffer 15, the subsystem can update the video data stored in the video buffer 15 by using the update timings synchronized with its pixel clock and its horizontal sync signal, and simultaneously, the video signals stored in the multiport video RAMs can be fetched out with the sync clock signal SC derived from the sync clock generator 14 and mixed with the video signals coming from the main system.

Though only one video buffer 15 is shown in FIG. 4, a plurality of video buffers 15 are used in the display control unit of FIG. 2.

Description will be made of the memory control and refresh logic 16 next.

There are three major memory cycles in the system of this embodiment, that is, update cycle, refresh cycle and transfer cycle.

All of the necessary control signals for the video buffer 15 to operate on such three memory cycles are generated by the memory control and refresh logic 16.

Figure 5:
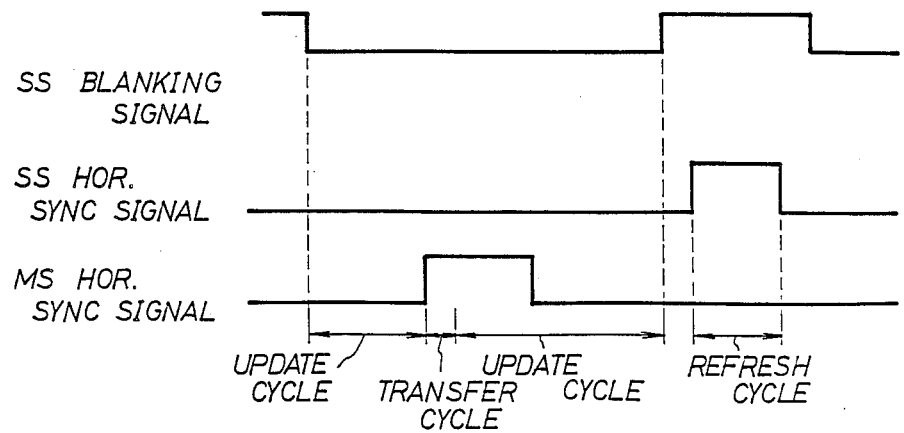
FIG. 5 is a timing diagram illustrating a relationship among three cycles in the video buffer 15 shown in FIG. 4.

FIG. 5 is a timing diagram illustrating one example of the relationship among the three cycles in the video buffer 15 shown in FIG. 4.

The update cycle is performed during the subsystem's display enable period. In the cycle, the subsystem's video signal is sampled and stored in the video buffer 15.

During subsystem's sync signal period, the refresh cycle is performed for refreshing the dynamic RAMs of the video buffer 15.

The transfer cycle is performed during a certain small time slice within the main system's horizontal sync signal.

The video data stored in the memory array 15A of the video buffer 15 is transferred to the shift register 15B as shown in FIG. 4 and prepared to display on the main system's CRT display device at the coming scanning line.

Since the video signals of the main system and subsystem are asynchronous, the transfer cycle may be overlapped with the update cycle or the refresh cycle.

In this case, the transfer cycle has the highest priority and the update cycle or refresh cycle is cancelled for a few cycles (for example, 2-4 cycles) to let the transfer cycle be executed reliably.

For the refresh cycle, since there are sufficient number of refresh cycle clocks, the dynamic RAMs of video buffer 15 can be refreshed even if several refresh cycles are cancelled.

Further, for the update cycle, although there will be some pixels not updated, but these pixels will be updated in the next frame.

Accordingly, the function as the video mixer will not be affected at all.

The memory control and refresh logic 16 coordinates these three memory cycles, generates the memory control signals RAS, CAS, WE and TR/OE, and further, generates the update address clock UDCK and refresh address clock RACK.

Further, it generates the address select signal ASEL for the address multiplexer 19 and the shift clock SSCK for the S-P shift register 20 and the shift clock PSCK for the P-S shift register 21 respectively.

Furthermore, in order to replicate the video signal of the subsystem in the vertical direction, the clock of the transfer address counter 27 is also controlled by the memory control and refresh logic 16. The transfer address is kept unchanged for a predetermined number of horizontal scanning lines according to the value of the maximum vertical replication factor Rv (max).

Explanation will then be made of the mixer 22.

The mixer 22 is provided with a logic circuit for receiving the main system's blanking signal, subsystem's display enable signal D-en and mode select signals ms0-ms2 and executing the respective processings corresponding thereto.

Figures 6, 7:
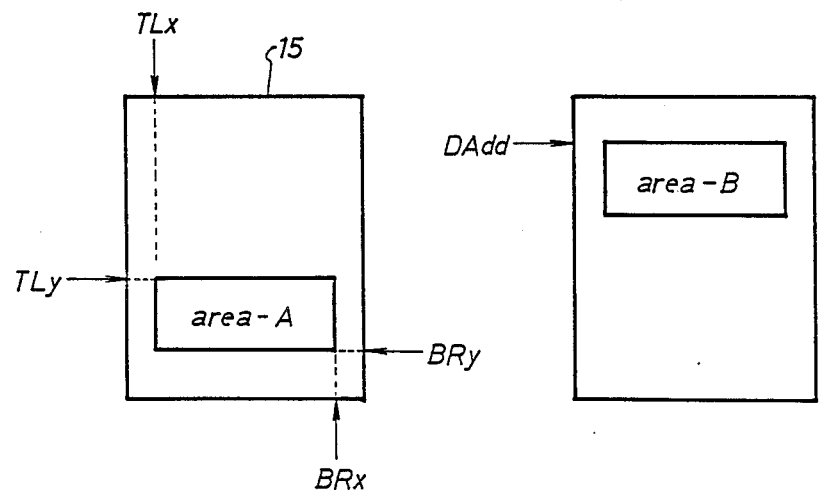
FIG. 6 is a table showing a function of the mixer 22 shown in FIG. 2.
FIG. 7 is a view illustrating a correspondence between the video buffer 15 shown in FIG. 2 and the CRT screen.

FIG. 6 is a table illustrating one example of the function of the mixer 22 shown in FIG. 2.

By applying "0" or "1" to the mode select signals ms0-ms2 in variously ways as in FIG. 6, various display states shown at the right most column in the table can be obtained.

The subsystem's video display and the main system's video display may occupy the same position on the CRT display device.

In order to prevent the desired main system's video display being covered by the subsystem's video display, a function called subsystem window is provided.

The subsystem window is performed by the blocks 23 to 35 in FIG. 2.

The subsystem window has high flexibilities as shown below.

At first, users can define the width and the length of the window, which can cover any area of the video buffer 15.

Next, the window can be moved on the CRT screen at the speed equal to the CRT frame rate in the vertical direction. This feature is enough to prevent the desired main system's video display from being covered by the subsystem's video display.

FIG. 7 is a view showing one example of the correspondence between the video buffer 15 shown in FIG. 2 and the CRT screen. In the drawing, TLx represents the top left X-address of the area A in the video buffer 15, TLy represents the top left Y-address of the area A, BRx represents the bottom right X-address of the area A, and BRy represents the bottom right Y-address of the area A. DAdd represents the display address of the area B on the CRT screen. The area A represents the area on the video buffer 15 corresponding to the user defined window. The area B represents the area on the CRT screen corresponding to the area A.

The video data in the area A is the data that the user wants to display in the area B on the CRT screen as the subsystem window.

For designating the area A on the video buffer 15, top left X-address TLx, top left Y-address TLy, bottom right X-address BRx and bottom right Y-address BRy are necessary.

Further, for positioning the area B on the CRT screen corresponding to the area A on the video buffer 15, it is also necessary to provide the display address DAdd on the CRT screen.

The display control unit of the invention is characterized mainly by the blocks explained above.

Explanation will then be made of the general operation of the display control unit of FIG. 2.

The subsystem's dot clock generator 11 generates dot (pixel) clocks for use in the subsystem, and the subsystem's video data is sent out at this clock rate.

The main system dot clock generator 12 generates dot (pixel) clocks used in the main system-, and the main system's video data is sent out at this clock rate.

The blanking signal generator 13 generates the blanking signals of the main system and subsystem. There are counters and DIP switches inside the generator 13. The operator can set the DIP switches with respect to the blanking information.

The reason that the blanking signal generator 13 is necessary is that the video output of the CRT display device generally contains video signal, horizontal sync signal, vertical sync signal and grounding potential, but contains no blanking signal. In view of the above, the blanking signal synchronized with the horizontal sync signal or vertical sync signal is generated by the blanking signal generator 13.

The sync signal generator 14 has a function of generating the sync clock required for displaying the subsystem's video signal on the main system's CRT. It changes the rate of the subsystem's video signal dot (pixel) clock. The details have already been explained specifically referring to FIG. 3.

As already explained referring to FIG. 4, the video buffer 15 has the memory array 15A comprising the multiport video RAMs and the shift register 15B.

The memory control and refresh logic 16 has also been explained in details. It outputs various kinds of control signals for the blocks 17-21 described later.

It coordinates the three memory cycles and also generates the memory control signals RAS, CAS, WE and TR/OE, update address clock UDCK, and refresh address clocks RACK.

It also generates the address select signal ASEL for the address multiplexer 19 and also generates the shift clocks SSCK and PSCK for the S - P shift register 20 and the P - S shift register 21 respectively. Further, it also controls the clocks of the transfer address counter 27.

The update address generator 17 generates the address for updating the video buffer.

The refresh address generator 18 generates refresh address for refreshing the video buffer 15 comprising the dynamic RAMs.

The address multiplexer 19 selects one of the update address, refresh address and transfer address according to the memory cycles.

The shift register 20 is a serial-in-parallel-out converter.

The pixel clock rate of the subsystem's video data is faster than the access time of the memory array 15A of the video buffer 15. In order to buffer the high speed video data of the subsystem, the shift register 20 converts the data into a low speed parallel video data. The parallel video data is distributed into several separated memory arrays in the video buffer 15.

As a result, the pixel clock rate is lowered and the access time requirement of the memory array 15A in the video buffer 15 is satisfied.

The shift register 21 is a parallel-in-serial-out converter. Since the serial video data is converted by the shift register 20 into parallel video data and stored in the memory array 15A, the shift register 21 is provided to collect the pixel data from the shift register 15B of the video buffer and convert them into serial video signals before sending to the CRT display device of the main system.

The mixer 22 has also been described already. That is, it combines the main-system's video signal with the subsystem's video signal on the CRT screen in accordance with the designated mode.

The scanning line counter 23 counts the number of scanning lines on the CRT screen during main system's display enable period.

The screen address latch 24 stores the screen display address DAdd, that is the start address of the window in which the subsystem's video data to be displayed is contained. The window can be moved in the vertical direction.

The first comparator 25 compares the output address of the scanning line counter 23 with the screen display address DAdd latched in the screen address latch 24.

If these addresses are equal the first comparator 25 sends a signal to the transfer address counter control logic 26 to instruct the transfer address counter 27 to start the counting. In this case, the transfer address counter 27 is given the content of the top left Y register 29 previously. The counting is started from this content value.

The transfer address counter control logic 26 generates the vertical display enable signal VD - en enabling the subsystem's video display in the vertical direction based on the outputs of the first comparator 25 and the second comparator 28 and sends it to the display control logic 35.

While the vertical display enable signal VD - en is generated, the transfer address counter control logic 26 sends clocks to the transfer address counter 27 under control of the main-system's blanking signal.

The transfer address counter 27 counts the row address of the dynamic RAMs of the video buffer 15. The video data designated by the row address is sent to the shift register 15B of the multiport video RAM.

The output of the transfer address counter 27 and the content of the bottom light Y register 30 are compared in the second comparator 28.

When these are equal, the second comparator 28 sends a signal to the transfer address counter control logic 26 to stop the transfer address counter 27 from counting.

The top left Y register 29 stores the Y-address, that is, the address of the top left corner of the user defined window on the video buffer 15. In FIG. 7, the top left Y register 29 stores the top left Y address TLy on the video buffer 15.

The bottom right Y register 30 stores the Y-address, that is, the address of the right bottom corner of the user defined window on the video buffer 15. In FIG. 7, bottom right Y address BRy is stored in the bottom right Y register 30.

The top left X register 31 stores the X-address TLx of the top left corner of the window also on the video buffer 15 in FIG. 7.

The bottom right X register 32 stores the X-address BRx of the bottom right corner of the window on video buffer 15.

The pixel counter 33 counts the number of pixels during main system's display enable period and sends its output to the comparison and control logic 34.

The comparison and control logic 34 compares the output of the pixel counter 33 with the X-address TLx stored in the top left X register 31 first, and then compares the output of the pixel counter 33 with the X- address BRx stored in the bottom right X register 32. The comparison and control logic 34 generates the horizontal display enable signal HD - en depending on a result of the comparison.

Within the period of horizontal display enable signal HD - en, the subsystem's video display in the horizontal direction is enabled.

In addition, for generating the enable signal TLx - en for controlling the top left X register 31 and the enable signal BRx - en for controlling the bottom right X register 32, the output of the main-system's blanking signal generator 13 is applied to the comparator and control logic 34.

The display control logic 35 generates the display enable signal Dis - en on the basis of the horizontal display enable signal HD - en and the vertical display enable signal VD - en.

For this purpose, the horizontal display enable signal HD - en derived from the comparator and control logic 34 and the vertical display enable signal VD - en derived from the transfer address counter control logic 26 are inputted to the display control logic 35.

Within the period of the display enable signal Dis - en, the subsystem's video signal display is enabled and display is not made outside the period.

Explanation will then be made of the operation of the display control unit shown in FIG. 2 by using timing diagrams.

Figure 12A:
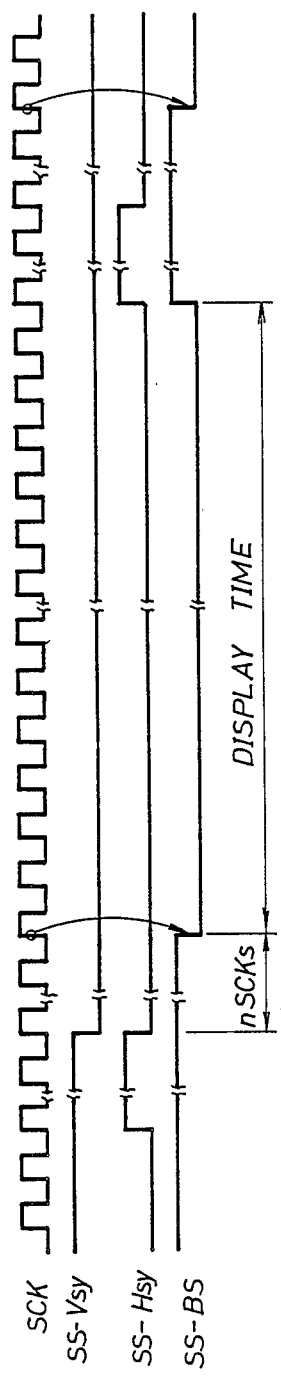
FIG. 12 is a timing diagram of the blanking signal generator 13.

In the blanking signal generator 13, the subsystem's blanking signal SS - BS turns to the high level as soon as the subsystem's horizontal sync signal SS - Hsy turns to the high level, and it returns to the low level upon generation of n shots of subsystem's pixel clock SCK after the horizontal sync signal SS - Hsy has returned to the low level as shown in FIG. 12(a). The number n is inherent in the subsystem and the period for which the blanking signal SS - BS remains at the low level is the display period of the subsystem.

Figure 12B:
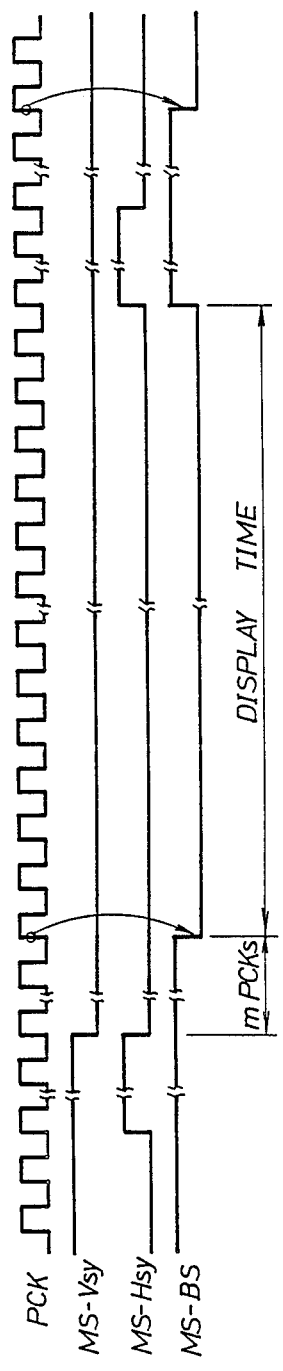

In the same manner as shown in FIG. 12(b), the main system's blanking single MS - BS turns to the high level as soon as the main system's horizontal sync signal MS - Hsy turns to the high level, and it returns to the low level upon generation of m shots of main system's pixel clock PCK after the horizontal sync signal MS - Hsy has returned to the low level. The number m is inherent in the main system, and the period for which the blanking signal MS - BS remains at the low level is the display period of the main system. The numbers m and n are numbers corresponded respectively to the data display areas in the respective CRT screens of the main system and the subsystem.

Figure 13A:
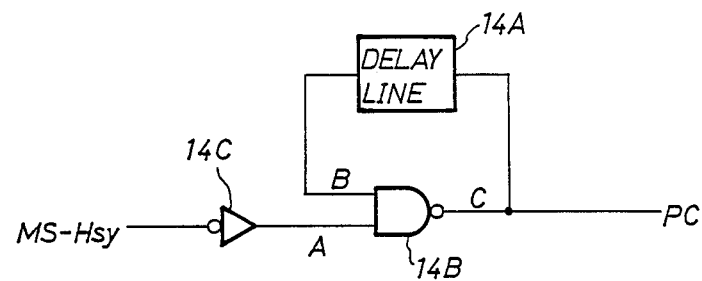
FIG. 13 is a timing diagram of the sync clock generator 14.
Figure 13B:
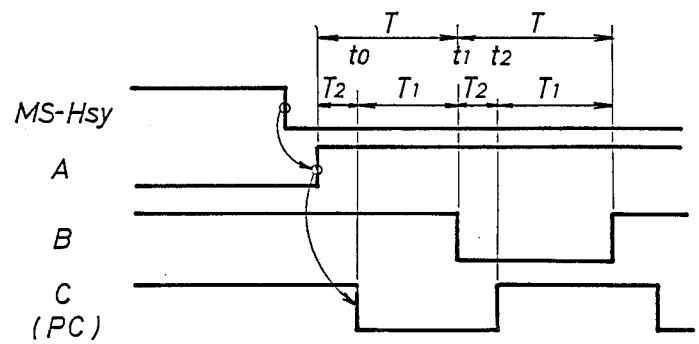

Explanation will be made of the relationship between the inputs A, B and the output C of the NAND gate 14B of the sync clock generator shown in FIG. 13(a) by referring to FIG. 13(b).

As long as the main system's horizontal sync signal MS - Hsy inputted to the inverter 14C stays at the high level, the input A is at the low level, and accordingly, the input B and the output C are kept at the high level. After the horizontal sync signal MS - Hsy has turned to the low level, the input A turns to the high level. Accordingly, the output C also turns to the low level at time t0 after an elapse of the delay time T2 due to the NAND GATE 14B. Although the input B is at the high level at time t0, it turns to the low level at time t1 after an elapse of the delay time T1 due to the delay line 14A, and accordingly, the output C returns again to the high level at time t2 after the elapse of the delay time T2 due to the NAND GATE 14B. Since the output C turns at intervals of time T (T=T1+T2) hereafter, sync clock PC having the period 2T can be obtained.

Then, explanation will be made of the operation of the P - S shift register 21 in a case where subsystem's video data of 3 bit parallel (D1, D2, D3) transmitted from the video buffer 15 are converted into the serial video data VDD.

Figure 14:
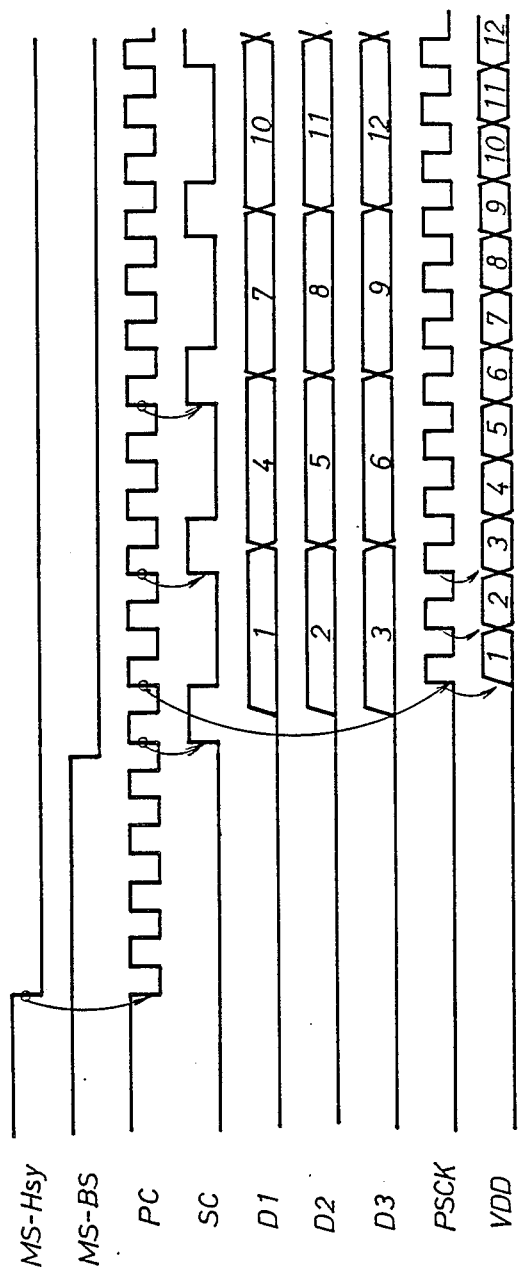
FIG. 14 is a timing diagram of the shift register 21.

As shown in FIG. 14, at the rise of the first sync clock PC after the main system's blanking signal MS - BS has turned to the low level, the sync signal SC is generated, and after that one sync signal SC is formed on every occurrence of three PCs as shown in FIG. 14. The P - S shift register 21 converts the parallel video data $D_1$ (1, 4, 7, 10 —), $D_2$ (2, 5, 8, 11 —), $D_3$ (3, 6, 9, 12, —) into the serial data at the rate of the shift clock PSCK on every reception of the sync signal SC. In this way, serial video data VDD (1, 2, 3, 4 — 12, —) can be obtained.

Next, explanation will be made of the transfer cycle in the video buffer 15 referring to FIG. 15.

Figure 15:
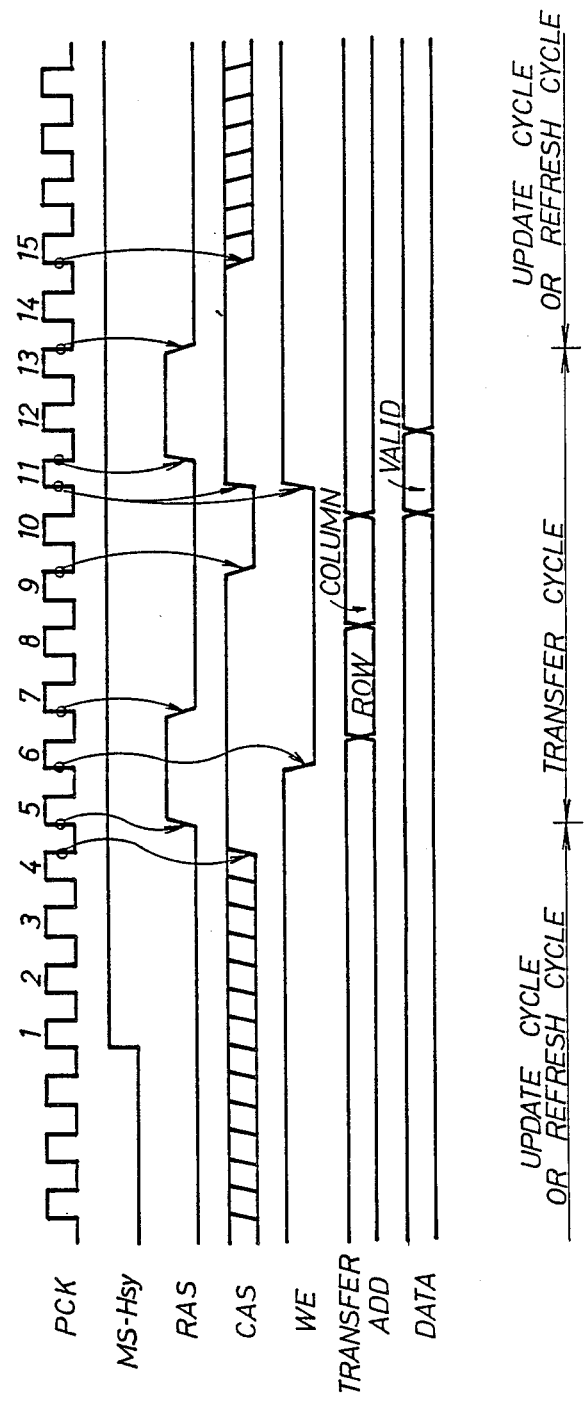
FIG. 15 is a timing diagram of a transfer cycle.

As shown in FIG. 15, at the rise of the 5th main system's pixel clock PCK after the main-system's horizontal sync signal MS-Hsy has turned to the high level, the memory control signal RAS turns to the high level, and this moment is the start of the transfer cycle. Then, the control signal RAS returns to the low level at the rise of the 7th clock.

Further, the control signal RAS again turns to the high level at the fall of the 11th clock and then again returns to the low level at the fall of the 13th clock. This moment is the end of the transfer cycle.

The memory control signal TR/OE turns to the low level at the rise of the 6th clock and return to the high level at the rise of the 11th clock.

During the period for which the memory control signal TR/OE remains at the low level and the memory control signal WE remains at the high level, the transfer addresses ROW, COLUMN are sent from the address counter 27 to the address multiplexer 19. Then, the video data VALID of horizontal scan line is transferred to the shift register 15B.

Explanation will be made of the update cycle in the video buffer 15 referring to FIG. 16 next.

Figure 16:
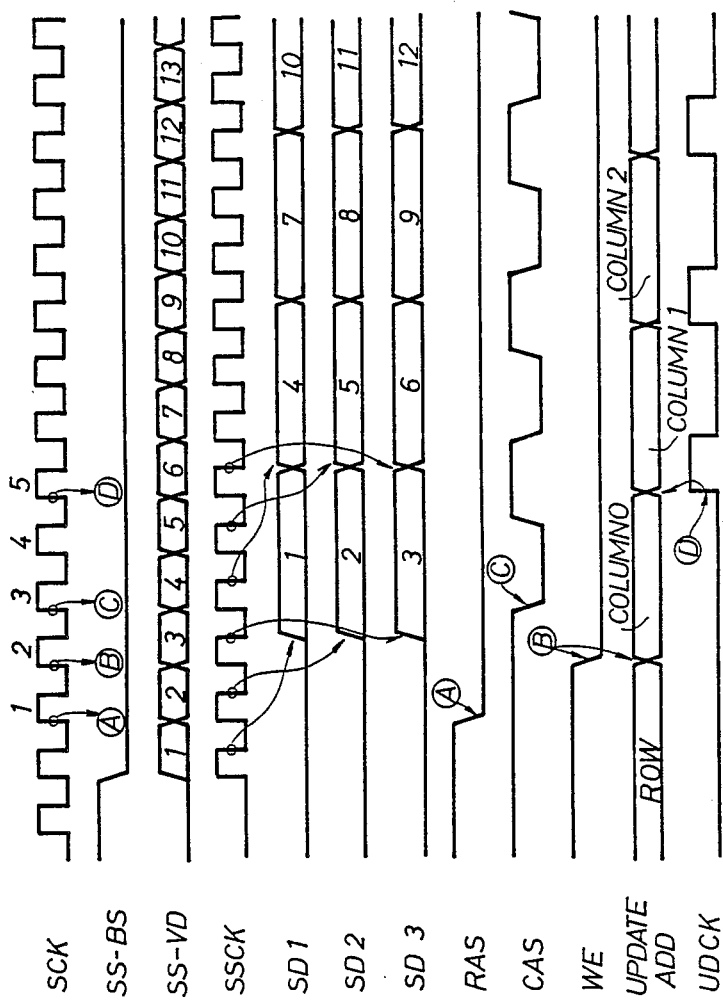
FIG. 16 is a timing diagram of an update cycle.

As shown in FIG. 16, at the rise A of the first subsystem's pixel clock SCK after the subsystem's blanking signal SS-BS has turned to the low level, the memory control signal RAS turns to the low level, and this moment is the start of the update cycle. The memory control signal WE turns to the low level at the rise B of the second clock. At the rise D of the 5th clock, the update address clock UDCK having the period three times as long as that of the pixel clock SCK is formed. With every clock UDCK, the update address generator 17 sends the address (COLUMN $\phi$, COLUMN 1 —) of the data to be updated to the video buffer 15.

With every update address signal (COLUMN $\phi$, COLUMN 1, —), the video buffer 15 update the corresponding data with video data SD1, SD2, SD3.

Explanation will be made of the refresh cycle in the video buffer 15 referring to FIG. 17 next.

Figure 17:
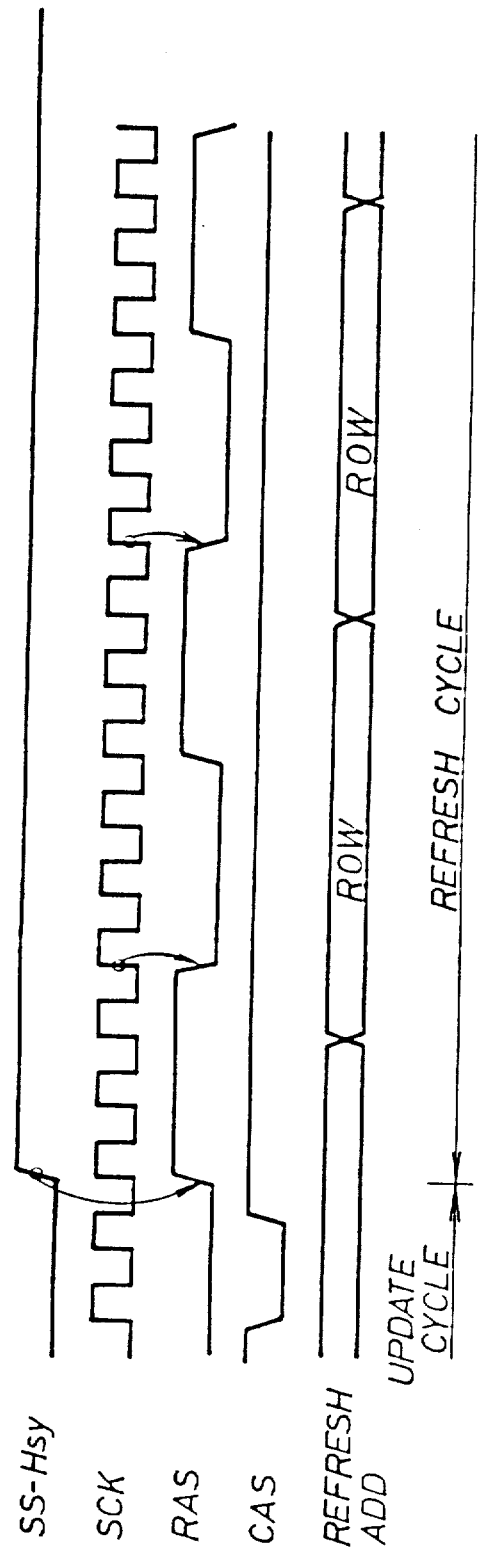
FIG. 17 is a timing diagram of a refresh cycle.

As shown in FIG. 17, the refresh cycle is performed during the period for which the subsystem's horizontal sync signal SS-Hsy stays at the high level. In a case where the subsystem's video data is converted by the S-P shift register 20 into the 3-bit parallel data, the memory control signal RAS turns at intervals three times as long as the period of the subsystem's pixel clock.

Figure 18:
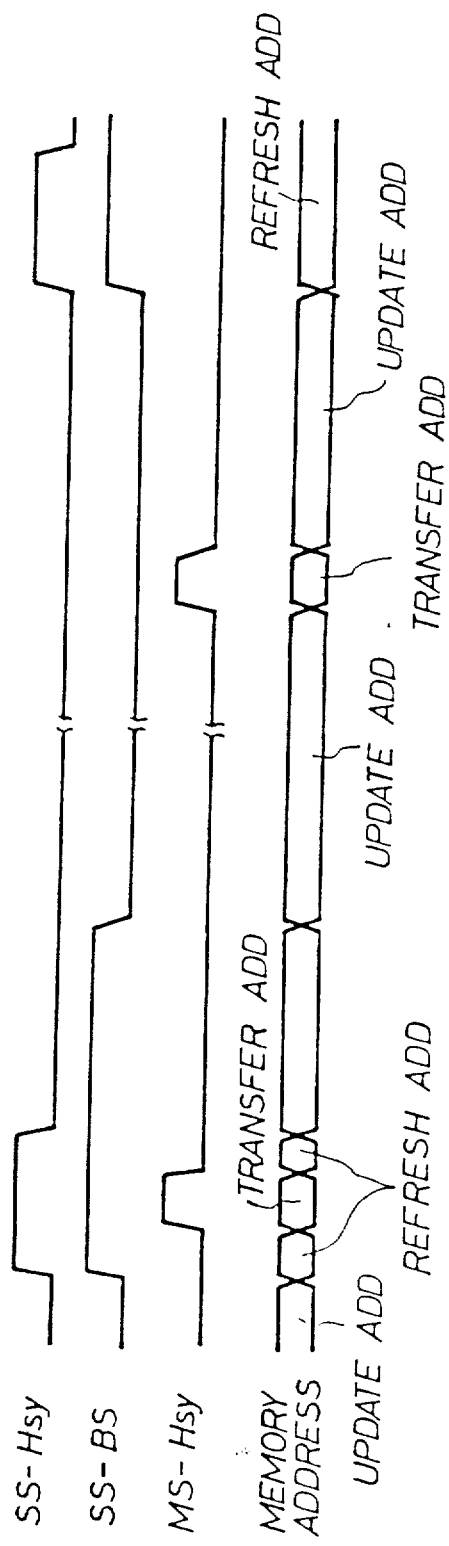
FIG. 18 is a timing diagram of the address multiplexer 19.

Finally, the operation of the address multiplexer 19 is explained referring to FIG. 18.

As shown in FIG. 18, the address multiplexer 19 outputs the transfer address with priority while the main system's horizontal sync signal is being outputted, the refresh address while the subsystem's horizontal sync signal is being outputted, and the update address during cycles other than the cycles described above if the subsystem's blanking signal is not outputted, respectively.

First Example

Explanation will made of a specific example in which an image display system controlled by the display control unit having the foregoing constitution, combines video signals sent from a subsystem with those of a main system and displays them on a screen of the main system.

Assume that the subsystem has several kinds of text mode and graphic mode, in which the maximum resolution of the text mode is 720×350 pixels, while that of the graphic mode is 640×350 pixels. There are six drive video signals (primary red, green and blue, and secondary red, green and blue) in the subsystem's video output.

The memory of the video buffer is constructed as six bit planes and 768×512 bits for each bit plane.

Further, sync signals of the main system are defined as below:

Horizontal scanning frequency=52.45 KHz
Vertical scanning frequency=77.86 Hz
Video band width=100 MHz
Resolution=1280×1280 (interlace)
Display time of one horizontal scanning line=14.665 $\mu$s A sync clock generator is provided for displaying the subsystem's video data stored in the video buffer with such sync signals.

Figures 8A, 8B:
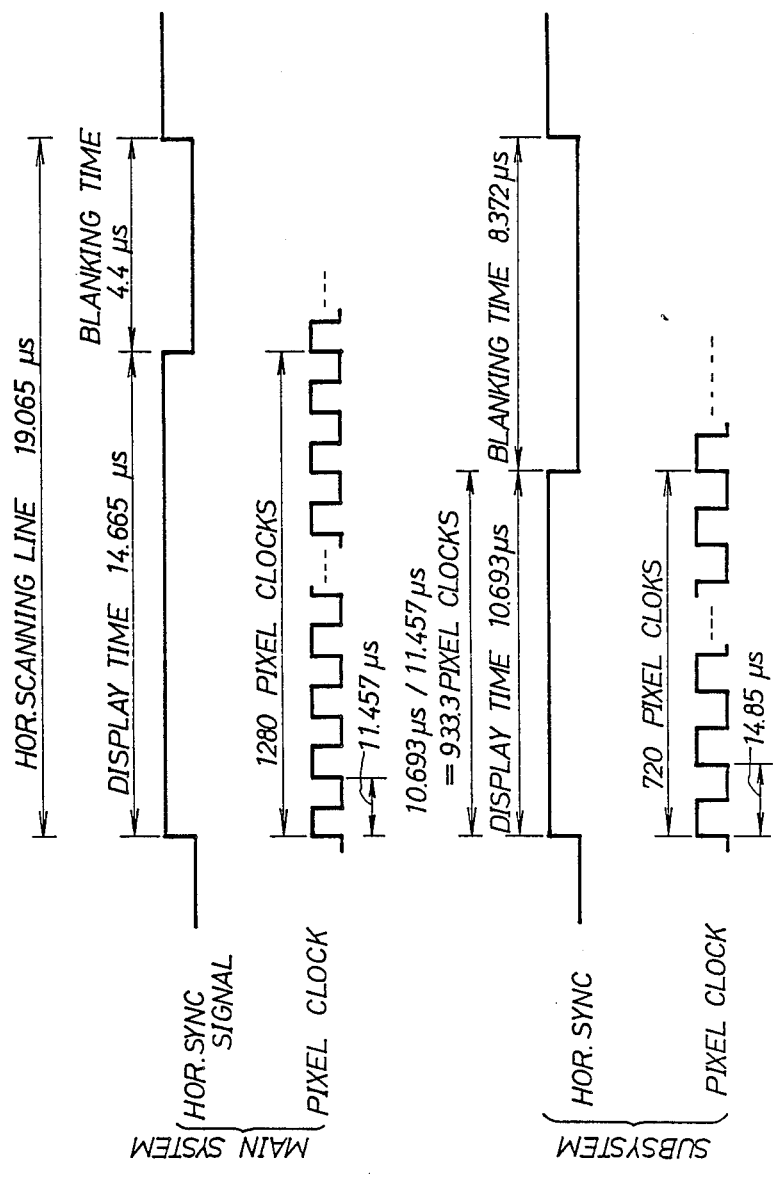
FIG. 8a and 8b are timing diagrams showing a relationship between a horizontal scanning line and pixel clocks in the display system according to the present invention.

FIG. 8(a) is a timing diagram of horizontal scanning of the main system of this example.

When the subsystem is synchronized with the horizontal sync signal of the main system, the clock rate of the video buffer 15 can be selected arbitrarily.

However, in order to display the subsystem's text image and graphic image as large as possible on the display screen of the main system and to keep the subsystem's fidelity as good as possible, the pixel clock rate is selected as follows.

If the aspect ratio of the subsystem is 4:3, and that of the main system is 1:1, then $$(Sx/Sy) \times (My/Mx) = (4/3) \times (1/1) = 4/3$$

Accordingly, the equations (a) and (b) shown previously are simplified as follows:

(a)' $Pv = Rv \times (Sv/Mv) \times 100$ (b)' $Ph = Pv \times (4/3)$

In a case where the maximum resolution of the graphic mode is 640×350 pixels, and the maximum resolution of the text mode is 720×350 pixels respectively in the subsystem, then Rv(max)=2, $Pv = 2 \times (350/1280) \times 100 = 54.6875$ (%)

$Ph = 54.6875$ (%) $\times (4/3) = 72.917$ (%)

The display enable signal Dis-en of the subsystem in the horizontal scanning line = 14.665 (μs) × 72.917 (%) = 10.693 (μs)

The sync clock PC for 640×350 mode

= 10.693 (μs)/640

= 16.71 (ns)

÷ 59.851 MHz

The sync clock PC for 720×350 mode

= 10.693 (μs)/720

= 14.85 (ns)

÷ 67.332 MHz

The timing diagram of the subsystem in this case is shown in FIG. 8(b).

In the same manner, in a case where the maximum resolution of the graphic mode is 640×200 pixels, and the maximum resolution of the text mode is 32×200 pixels, respectively in the subsystem, Rv(max)=4

$$Pv = 4 \times (200/1280) \times 100 = 62.5, (\%)$$

$$Ph = 62.5 (\%) \times (4/3)$$
$$= 83.333 (\%)$$

The display enable signal Dis-en of the subsystem's in the horizontal scanning line = 14.665 (μs) × 83.333 (%)

= 12.221 (μs)

The sync clock PC for 640×200 mode

= 12.221 (μs)/640

= 19.1 (ns)

÷ 52.37 MHz

The sync clock PC for 320×200 mode

= PC for 640×200 mode × ½ (MHz)

The sync clock generator 14 generates four kinds of sync clocks (16.71 ns, 14.85 ns, 19.1 ns and 38.2 ns) simultaneously. For automatically selecting one sync clock out of the four kinds of sync clocks, a circuit is disposed for detecting which mode is executing in the subsystem.

Second Example

The display control unit according to the present invention can be practiced also in the case of receiving at least two independent subsystem's video signals.

In the block diagram already shown in FIG. 2, the explanation has been made of the case for combining video data sent from one sub-system with that of one main system.

For the case there are two or more subsystems, all the blocks shown in FIG. 2 must be duplicated by the same number as the number of the subsystems.

Figure 9:
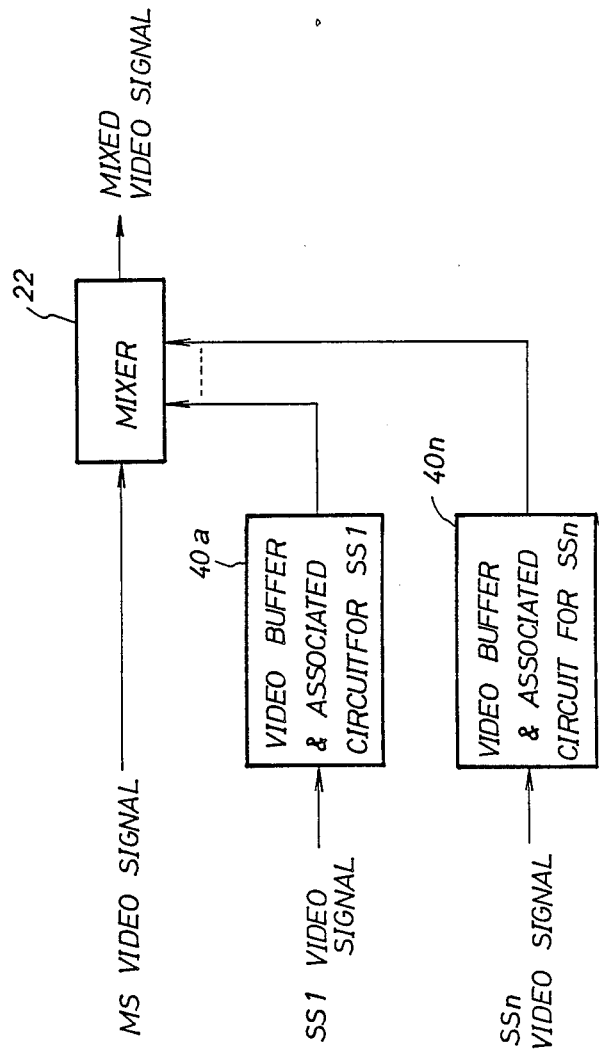
FIG. 9 is a block diagram of the display system according to the present invention in which two or more subsystems are connected.

FIG. 9 is a block diagram of the display system according to the present invention in which two or more subsystems are connected. Reference numerals 40a and 40n represent video buffers and associated circuits of subsystem 1 and subsystem n respectively.

As shown in FIG. 9, for the case there are two or more subsystems to be connected, it is only required to duplicate the video buffer and the associated circuit shown in FIG. 2 by the number of subsystems.

Third Example

The display control unit according to the present invention can process not only the digital video signals as explained before referring to FIG. 2 but also the following video signals.

For instance, it may be a composite analog video signal in which a sync signal is mixed.

In this case, other blocks are added to the blocks shown in FIG. 2.

Figure 10:
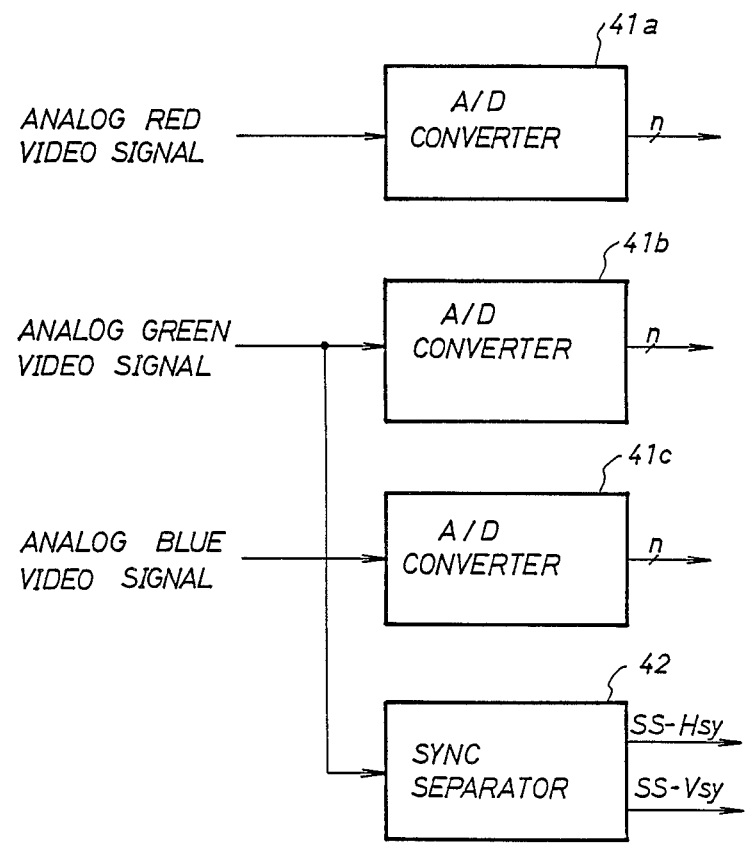
FIG. 10 shows analog to digital converters and a sync separator of the display control unit according to the present invention in which composite analog video signals having a sync signal are inputted.

FIG. 10 shows analog to digital converters and a sync separator of the display control unit according to the present invention in which composite analog video signals having a sync signal are inputted. In the drawing, 41a–41c represent N bit analog to digital converters respectively, and 42 represents a sync signal separator.

For a color CRT, three signal lines (analog red video signal, analog green video signal having sync signal and analog blue video signal) are inputted to the converters.

The converters 41a–41c convert analog video signals into N bit digital video signals. Each of the digital video signals thus converted is processed by the unit shown in FIG. 2.

Further, the sync separator 42 separates a horizontal sync signal and a vertical sync signal from the analog green video signal.

By adding the blocks shown in FIG. 10 to the blocks shown in FIG. 2 and by providing the same number of shift registers and video buffers as the number of the signal lines, the video mixer can receive the composite analog video signal.

For a monochrome CRT, the case is the same as the color CRT except that only the block for the analog green video signal having sync signal is needed.

Further, the video signal may be an analog video signal separated from the sync signal for a color CRT or a monochrome CRT.

Figure 11:
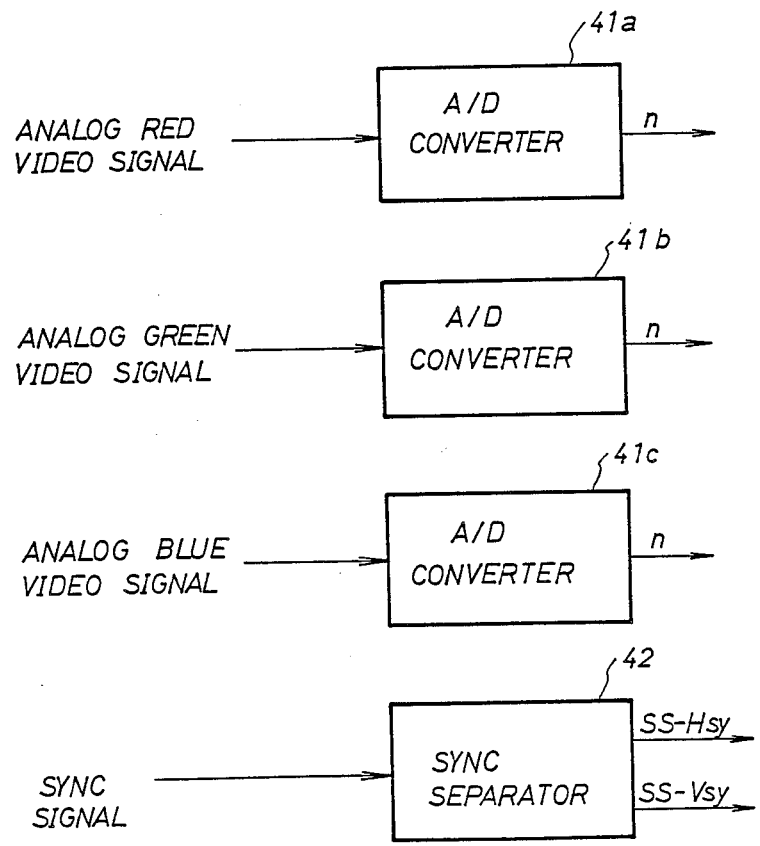
FIG. 11 shows analog to digital converters and a sync separator of the display control unit according to the present invention in which composite analog video signals separated from the sync signal are inputted.

FIG. 11 shows analog to digital converters and a sync separator of the display control unit according to the present invention in which composite analog video signals separated from a sync signal are inputted.

The block diagram of FIG. 11 is for the color CRT, which is the same as that of FIG. 10 except that the sync signal input line is isolated from the analog green video signal.

The display control unit of the present invention has the following advantageous effects.

Since at least two CRT video sources are mixed to display on a CRT display device, the number of CRT display devices is reduced to only one. Usually the cost of CRT display device is higher than that of the display control unit, so that the total cost is reduced.

If a display system has two CRT video information sources, the operator has to handle two CRT display devices without the display control unit according to the present invention. When the operator handles the two CRT display devices, the operator's burden is increased to lower the operational efficiency. However, with the display control unit according to the present invention, such an inconvenience can be removed since the video data of independent video sources can be displayed on one CRT display device.

Generally, there occurs such a case that the main system is linked with other subsystems to share the information for each other. For example, a certain manufacturer has been supplying many information sources as packages for use in personal computer systems. With the display control unit of this invention, it is possible to generate video signals contained in those packages in the subsystem and send them to the image display device of the main system, thereby utilize them as the visible information on the screen of the display device. Accordingly, users can utilize those packages processed separately and provided independently as information sources cross linked with each other.

What is claimed is:

1. A video signal mixing unit for simultaneously displaying a first video signal and a second video signal transmitted from a first video information source and a second video information source respectively on a single CRT display device,
    said first video information source having a first aspect ratio and a first resolution and being controlled by a first pixel clock and a first synchronizing signal, said CRT display device being controlled by said first pixel clock and said first synchronizing signal, said second video information source having a second aspect ratio and a second resolution different from said first resolution and being controlled by a second pixel clock and a second synchronizing signal, said video signal mixing unit comprising:
    video buffer means connected to said second video information source for storing said second video signal;
    third video pixel clock generating means connected to said first and second video information sources for generating, on the basis of said first and second aspect ratios, said first and second resolutions and a horizontal display time of one scanning line of said CRT display device, a third pixel clock with which said second video information source can be displayed on said CRT display device with said second aspect ratio; and
    video signal selecting means connected to said first video information source, and connected to said video buffer means and said third pixel clock generating means for selectively outputting said first video signal sent from said first video information source at a rate of said first pixel clock and said second video signal transferred from said video buffer means at a rate of said third pixel clock.

2. A unit according to claim 1, in which said third video pixel clock generating means comprises a delay line.

3. A according to claim 2, which said third video pixel clock generating means comprise a NAND gate an output of which is connected to an input of said delay line, one input of which is connected to an output of said delay line, and the other input of which is to be connected to said first video information source through an inverter for receiving a horizontal synchronizing signal contained in said first synchronizing signal.

4. A unit as in any one of claims 1, 2 or 3, in which said video buffer means comprises dual port memories.

5. A unit according to claim 4, in which said video buffer means has a shift register for converting said second video signal into a parallel signal and sending the same to said dual port memories.

6. A unit according to claim 5, in which said video buffer means has a shift register for receiving said parallel signal read out from said dual port memories and for converting the same into a serial signal and sending the same to said video signal selecting means.

7. A unit as in any one of claims 1, 2 or 3 wherein:
    said video signal selecting means has allocating means for allocating a position on said CRT display device at which said second video signal is to be displayed.

8. A unit according to claim 7 in which said allocating means comprises registers for storing addresses corresponding to said position.

* * * * *

UNITED STATES PATENT AND TRADEMARK OFFICE
CERTIFICATE OF CORRECTION

PATENT NO. : 4,878,117

DATED : Oct. 31, 1989

INVENTOR(S) : Kimimasa Ikehira, et al

It is certified that error appears in the above-identified patent and that said Letters Patent is hereby corrected as shown below:

The sheet of drawing consisting of Figs. 17 and 18 should be added as shown on the attached page.

Signed and Sealed this

Seventeenth Day of July, 1990

Attest:

*Attesting Officer*

HARRY F. MANBECK, JR.

*Commissioner of Patents and Trademarks*